Patented Oct. 15, 1940

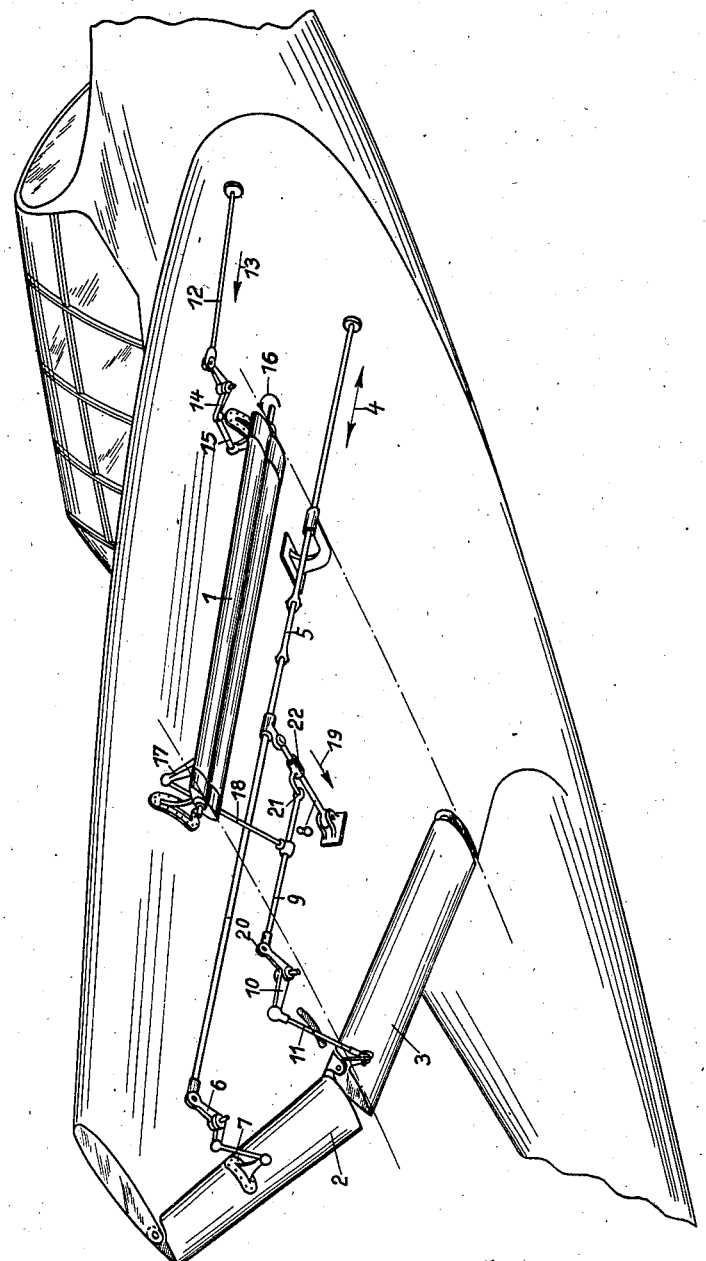

2,218,128

UNITED STATES PATENT OFFICE 2,218,128

AIRCRAFT HAVING ITS WINGS PROVIDED WITH DISTURBING BODIES

Herbert Wagner, Dessau, Germany, assignor to Junkers Flugzeug-und-Motorenwerke, Aktiengesellschaft, a corporation of Germany Application April 8, 1939, Serial No. 266,904
In Germany April 9, 1938

4 Claims. (Cl. 244—83)

It is known to arrange on the wings of aircraft disturbing bodies—so-called nose dive brakes—which in diving are adjusted to the operating position in which they influence the flow around the wing in such a manner as to exert a braking action checking the flight. For instance there has been arranged at the lower side of the wing a comparatively narrow swivelling batten extending over part of the span, which in its non-operating position extends in about the same direction as the lower side of the wing, but in its operating position assumes a position approximately vertical to the lower side of the wing. It has been shown that adjustment of the disturbing body to the operating position hinders the control of the aircraft in nose diving . There may in particular occur vibrations with the adjusting members used for the control of the aircraft, which are transmitted to the control actuating member to be operated by the pilot, resulting in a loss of the flight safety, in particular during diving.

The object of the invention is principally avoidance of vibrations in the control actuating member, facilitating the control and improving flight safety during nose diving. This object is attained in accordance with the invention by providing means in the adjusting members, which are transmitting control deflections of the aileron actuating member to the aileron, in order to reduce or completely prevent the angular movements of the aileron parts extending in the direction of flow behind the disturbing bodies when the disturbing body has assumed its operating position. When actuating the aileron during the dive there are adjusted only those aileron parts by their full angular amounts corresponding to the control movements of the aileron actuating member, which lie outside of field of flow affected by the disturbing bodies, whereas the aileron parts extending into the affected flow field behind the disturbing bodies perform reduced angular movements or none at all. In consequence thereof there will occur vibrations in the control member to be actuated by the pilot only to a greatly reduced extent or—in the case of idle aileron parts—not at all, so that exact control of the aircraft is now possible, which is especially required in nose diving.

The layout is preferably made in such a way, that the adjusting members for the disturbing bodies cooperate with the means for changing the control deflections of the aileron parts, located in the disturbed flow field, in such a manner that the movement carried out by the adjusting members of the disturbing bodies, when adjusting the latter into the operating position, is transmitted to the means for changing the angular deflections of the said aileron parts. Owing to the movement of the adjusting members of the disturbing bodies, when adjusting the latter to the operating position, the said means are then actuated in such a manner that the aileron parts, extending behind the disturbing bodies, in adjusting the aileron control member as compared with the remaining aileron parts, produce only reduced angular deflections or are not subjected to any angular movements, whatever, thus being kinematically decoupled from the aileron control member. The means for changing the deflections of the control surface of the aileron parts, extending into the disturbed flow field, may be designed in any manner suited to the conditions obtaining, for instance, as an adjustable gear (crank, rocker and the like), or as coupling, decoupling from the other parts of the aileron the aileron parts, extending behind the disturbing bodies, when the latter have been adjusted into the operating position.

It will be of advantage to provide arrangements (locking means) permitting of fixing the aileron parts, extending behind the disturbing bodies, in decoupled condition in suitable arrangement with reference to the wing. These locking means may be adjusted in such a manner, either by hand or in dependence of the adjusting members for the disturbing bodies when adjusting the latter into the operating position, that they will lock the aileron parts extending into the disturbed flow field (locking position).

It will be of special advantage to combine the locking means with the aileron parts located in the disturbed flow field for changing the deflections of the control surface.

Locking of the aileron parts located in the disturbed flow field is preferably not effected in their central position, but in an adjusted position, in which these aileron parts are swung downwards by a suitable angular amount. In this way the angle of incidence of the aircraft may be reduced as compared with the direction of flow, so that the surfaces of a customary horizontal tail unit extend outside of the flow field, which is disturbed by the disturbing bodies, and the control of the aircraft in diving is further facilitated.

The subject of the invention is represented in the illustration by a mode of construction, the illustration showing—viewed from the lower side of the wing—a disturbing body arranged at the lower side of a wing and aileron parts, to which is applied the arrangement according to the invention for changing the angular deflections of the aileron parts located in the disturbed flow field.

There is provided at the lower side of the wing the disturbing body or diving brake 1, permitting of being adjusted into the operating and non-operating position, and at the trailing edge of the wing the aileron parts 2 and 3, of which the latter aileron part 3 extends into the flow field affected by the disturbing body 1. The aileron parts 2, 3 are adjusted with the aid of a push rod 5, adjustable in the direction of the double arrow 4, the adjustment of the aileron part 2 taking place by way of the two-arm lever 6 and the guiding rod 7, whereas the aileron part 3 is adjusted, by way of a rocker 8, rod 9, two-arm lever 10 and guiding rod 11, in such a manner, that in the shown non-operating position of the disturbing body 1 angular deflections of the aileron parts 2 and 3 of the same relation will correspond to certain adjusting movements of the push rod 5.

The relation of the adjusting movement of the push rod 5 to the angular deflections of the aileron part 3 is changeable in such a manner that when adjusting the disturbing body 1 into the operating position, the same adjusting movements of the push rod 5 will correspond to reduced angular deflections of the aileron part 3, or that in a bordering case, when moving the push rod 5 in the direction of the double arrow 4, there will be no angular deflections of the aileron part 3. This is attained by the following arrangement:

The disturbing body 1 is shifted by 90°, when adjusting it into the operating position, by actuating the adjusting member 12 in the direction of the arrow 13 by way of the two-arm lever 14 and the guiding rod 15 in the direction of the arrow 16. This turning movement is transmitted to the rod 9 by a guiding rod 18 pivotally arranged at the lever arm 17 of the disturbing body 1 and this causes swinging of the latter in the direction of the arrow 19 around the axis of the joint 20 of the rod 9 and the lever arm 10. During the swinging action the rod 9 is passed through a sliding body 22, which is slidably arranged on the rocker 8, curved centrically to the joint point 20. This swinging action of the rod 9 results in an approach of the joint point 21 of the rod 9 and the rocker 8 to the swinging axis 23 of the rocker 8. In this way the movements transmitted from the rocker 8 to the rod 9 are reduced when adjusting the push rod 5 and there is no transmission of any kind of a movement from the rocker 8 to the rod 9, if the joint point 21 of the latter two coincides with the swinging axis 23 of the rocker 8. Corresponding to the reduced movements, or the stopping of the rod 9, with the same adjusting paths of the push rod 5, are the reduced or the entire absence of angular deflections of the aileron part 3 located in the disturbed flow field.

If the rod 9 is swung by the guiding rod 18 to such an extent that the joint point 21 coincides with the swinging axis of the rocker 8, this will simultaneously lock the part 3 of the aileron with respect to the wing. This locking permits of obtaining at the same time a suitable adjustment of the aileron part 3 with respect to the wing, for instance, by forming in a suitable manner the rocker 8 and its swinging axis 23, or by arranging them in relation to the swinging axis 24 of the double lever 10.

Hence, the aileron parts 3 located in the disturbed flow field perform only reduced angular deflections, or none at all, if the disturbing body 1 is adjusted into operating position and if the push rod 5 is actuated. This facilitates control of the aircraft during nose diving to such an extent, as to provide the possibility of reliably maintaining the direction in nose diving.

What is claimed is:

1. An arrangement of the character described comprising a wing, a diving brake mounted for movement thereon, an aileron portion pivoted on the wing in the flow field adapted to be influenced by the diving brake, means for moving the diving brake pivotally, means for moving the aileron portion about its pivot and means connected to the last named means and to the diving brake whereby movement of said brake to fully operative position locks the aileron moving means.

2. An arrangement of the character described comprising a wing, a diving brake pivoted thereon, an aileron portion pivoted on the wing in the flow field adapted to be influenced by the diving brake, means for moving the aileron portion pivotally, and means connecting the diving brake with the aileron moving means whereby movement of the brake towards its fully operative position progressively decreases the movement imparted to the aileron portion by its moving means.

3. An arrangement of the character described comprising a wing, a diving brake mounted for movement thereon, means for moving said diving brake into operative position, an aileron portion pivoted on said wing in the flow field adapted to be influenced by the diving brake, a second aileron portion pivoted on said wing, an actuating member, separate means connecting each aileron portion to said member whereby both aileron portions are adapted to be moved by movement of said member, and means connecting the diving brake with the means connecting the first named aileron portion and the actuating member whereby movement of the diving brake into operative position diminishes the proportionate pivotal movement of said first aileron portion upon movement of said member.

4. An arrangement of the character described comprising a wing, a diving brake pivoted thereon, means for moving said diving brake pivotally, two aileron portions separately pivoted on said wing one of which lies in the flow field adapted to be influenced by the diving brake, a movable actuating member, separate sets of pivot members connecting the actuating member with each aileron portion whereby movement of the actuating member is adapted to move both said portions equally, and means connecting the diving brake with the aileron portion located in said flow field whereby movement of the brake into operating position progressively diminishes the proportionate movement of the last mentioned aileron portion upon movement of the actuating member.

HERBERT WAGNER.